June 5, 1945. T. E. BROWN ET AL 2,377,669
PERCHLORINATION PROCESS
Filed Jan. 30, 1942
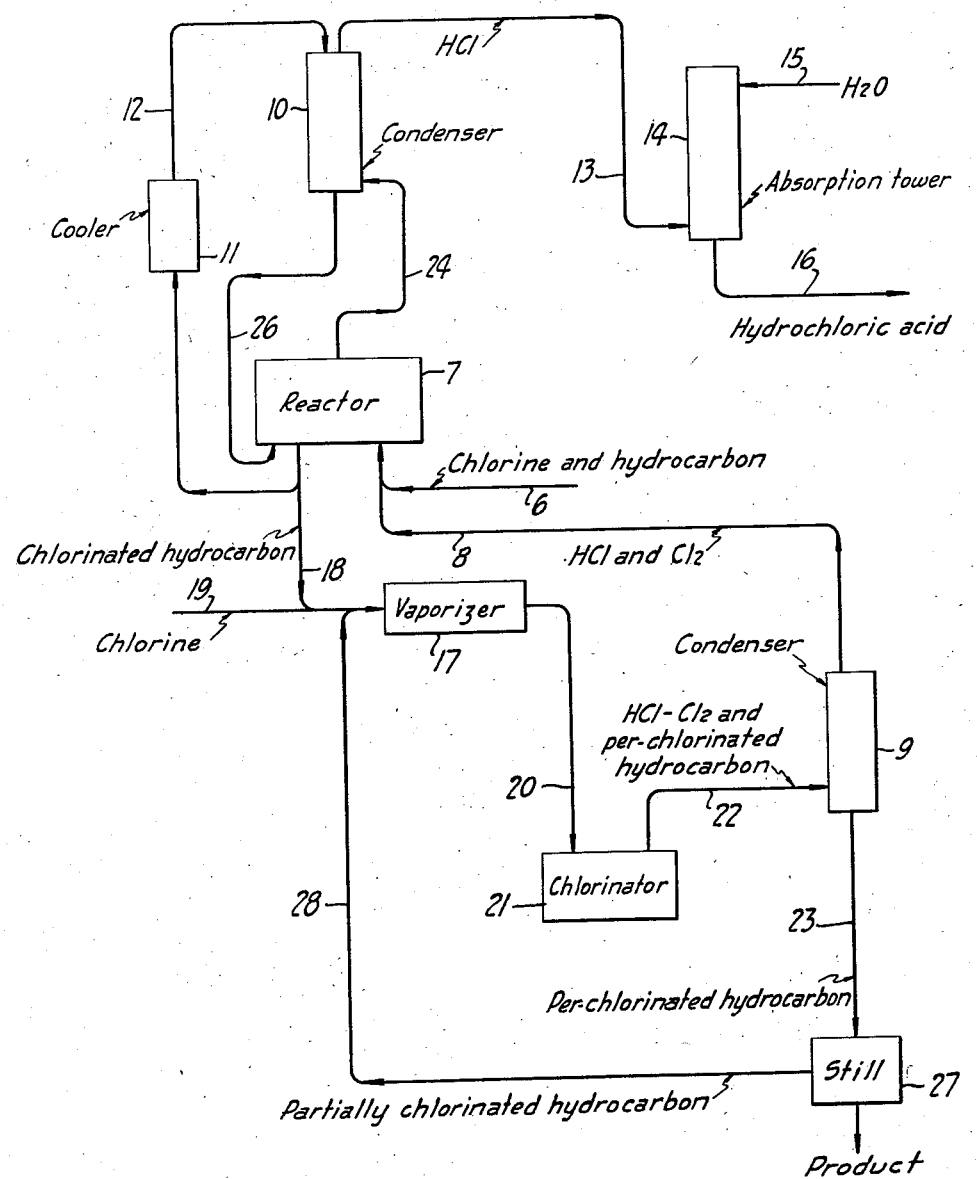
INVENTORS
Clyde W. Davis
Thomas E. Brown
BY Robert H. Eckhoff
ATTORNEY Patented June 5, 1945

2,377,669

UNITED STATES PATENT OFFICE 2,377,669

PERCHLORINATION PROCESS

Thomas E. Brown and Clyde W. Davis, Antioch, Calif., assignors to The Dow Chemical Company, Midland, Mich., a corporation of Michigan Application January 30, 1942, Serial No. 428,904

5 Claims. (Cl. 260—658)

This invention concerns an improved method for the manufacture of perchlorinated aliphatic compounds. It particularly concerns a method whereby propane may be chlorinated rapidly and without undue hazard to produce carbon tetrachloride and tetrachloroethylene in good yields.

It is known that octachloropropane may be prepared by chlorinating propane in liquid phase, e. g. in the presence of a liquid, while under exposure to actinic light. This photochemical chlorination may be carried out smoothly and rapidly to a point at which from 4 to 6 moles of chlorine have been consumed per mole of propane. Thereafter it occurs only sluggishly and the presence of a large excess of chlorine is usually required in order to complete the reaction and form the octachloropropane in good yield.

Propane has also been admixed with sufficient chlorine for its complete chlorination and the mixture has been passed through a bath of fused metal chlorides to effect simultaneous chlorination and cracking of the propane. Carbon tetrachloride and tetrachloroethylene are obtained as the principal products of the reaction, but by-products such as hexachlorobenzene, carbon and tars are usually formed in substantial amounts. Also, the reacted mixture evolved from the fused salt bath usually contains considerable free chlorine as well as the hydrogen chloride formed in the reaction.

Because of the high ratio of chlorine to the organic reactant, both of these known methods involve an explosion hazard. Such hazard may, of course, be avoided in practice of the first method by at first only partially chlorinating the propane to form higher boiling compounds and thereafter gradually introducing additional chlorine to complete the reaction, but such procedure is not well adapted to a continuous process and is inconvenient. In practice of the second of these known perchlorination methods such gradual introduction of the chlorine is not feasible and special precautions must be taken in order to avoid an explosion.

We have found that by combining these previously known chlorination methods in a particular way, the explosion hazard may be reduced or eliminated, and the chlorination may be carried out rapidly and in continuous manner to produce the perchlorinated products in good yields.

In addition, the combined processes are free of some of the other objectionable features attendant upon use of either process alone. For example, the exit gas from either process includes chlorine. For economical use this must be separated and recovered, an operation requiring care and expensive equipment. When the processes are combined, the excess chlorine from the salt bath is readily used in the photochemical chlorination which is conveniently adjusted to employ it instead of fresh chlorine.

The invention comprises partially chlorinating a lower aliphatic hydrocarbon, or a chloroaliphatic hydrocarbon containing not more than 2 chlorine atoms in the molecule, under exposure to actinic light and at low temperatures to a point at which the product contains an average of not more than 2 hydrogen atoms per atom of combined chlorine; mixing the partially chlorinated material with sufficient chlorine to complete the reaction and vaporizing the mixture; passing the resultant vapor mixture into and through a bath of fused metal chlorides, whereby the reaction to form the perchlorinated products is completed; condensing the perchlorinated products from the vapors which are evolved from the fused salt bath, and admixing the remaining gases, which comprise hydrogen chloride and usually some chlorine, with one or both of the gaseous reactants, e. g. chlorine and the organic reactant, which are being fed to the preliminary photochemical chlorination.

This combined perchlorination process is superior in several respects to either of the individual known perchlorination processes hereinbefore discussed. For instance, although the photochemical perchlorination occurs sluggishly in the final stages of the reaction, the preliminary and only partial photochemical chlorination required by the invention may be carried out smoothly and rapidly. The hazard of an explosion occurring and also the tendency toward by-product formation during a perchlorination in a fused salt bath become greater with increase in the proportion of chlorine to be consumed. By subjecting the organic reactant to a preliminary partial chlorination under photochemical conditions, the explosion hazard and the tendency toward by-product formation in the final chlorination in the fused salt bath are reduced. By introducing one-half or more of the chlorine required in the perchlorinated products during the preliminary photochemical chlorination, the possibility of an explosion occurring during the final chlorination in the salt bath may be eliminated. The feature of admixing the permanent gases, e. g. hydrogen chloride and chlorine, which are vented from the final salt bath chlorination with the gaseous reactants being fed to the preliminary photochemical chlorination is important in that by such procedure the chlorine and any organic ingredients in this vent gas are absorbed and utilized in the photochemical chlorination. Also, such dilution with hydrogen chloride of the feed to the photochemical chlorination reduces the possibility of this reaction occurring violently and renders possible an increase in the proportion of chlorine, relative to the organic reactant, over that which would otherwise be safe. As a consequence, in continuous practice of the invention the proportion of chlorine to be consumed in the preliminary photochemical chlorination may safely be increased with resultant decrease in the amount of chlorine to be consumed in the final chlorination with the fused salt bath. As just explained, any reduction in the proportion of chlorine which is to be consumed during the final fused salt bath chlorination reduces the possibility of an explosion.

The accompanying drawing is a flow sheet indicating certain apparatus which may be employed in practicing the invention and showing the flow of materials through the same.

In perchlorinating propane as indicated in the drawing, propane and from 3 to 6 molecular equivalents of chlorine are fed separately, or preferably together, into the reactor 7, wherein they are absorbed in a liquid reaction medium and are at the same time exposed to actinic light of intensity sufficient to effect smooth and rapid chlorination. As the reaction medium, polychloropropanes, such as those which are to be produced in this stage of the process are preferred, but other liquids, e. g. carbon tetrachloride, may be used. The actinic light required to catalyze the chlorination may be generated by an ultraviolet lamp situated inside of the reactor, or in other usual ways. The reaction may be carried out at atmospheric pressure or above and at any reaction temperature below that at which carbonization with resultant blackening of the mixture occurs, which temperature is, of course, dependent to some extent upon other variable conditions such as the proportion of chlorine present, the intensity of the actinic light, etc. In practice, the photochemical chlorination of propane is preferably carried out at atmospheric pressure or thereabout and at temperatures below 100° C. The rates at which the reactants are fed to the reaction are controlled so as to permit substantially complete consumption of the chlorine.

During the photochemical chlorination, a portion of the reaction liquor may advantageously be circulated from the reactor 7 to a cooler 11, wherein it is cooled preferably to a temperature below 0° C., and thence to the condenser 10 where it is used to scrub the hydrogen chloride that is vented from reactor 7 and absorb any unreacted chlorine or propane therefrom. The resultant liquor is returned from condenser 10 to the reactor 7. After being thus scrubbed, the hydrogen chloride, now free of chlorine, may be utilized as desired, e. g. it may be passed to an absorption tower 14 wherein it is treated with water to form a strong aqueous hydrochloric acid solution, as indicated in the drawing.

Another portion of the reaction liquor is withdrawn continuously from the reactor 7 and is preferably admixed with sufficient chlorine to complete the chlorination and thereafter vaporized in the heater or vaporizer 17. An excess of chlorine may be used at this stage of the process, but is not required. The chlorine which is admixed with the reaction liquor aids in vaporizing the latter and permits the vaporization to be accomplished at somewhat lower temperatures than would otherwise be possible. Alternatively, the reaction liquor may, of course, first be vaporized and thereafter be admixed with the chlorine. For purpose of avoiding the possibility of uncontrolled reactions occurring, the vaporized mixture of chlorine and the partially chlorinated product is, of course, maintained at temperatures not greatly above that required for vaporization, e. g. at temperatures below about 300° C. and preferably below 200° C., over the major part of its travel from the vaporizer 17 to the fused salt bath chlorinator 21.

The vaporized mixture of chlorine and the partially chlorinated product is passed to the salt bath chlorinator 21 where it is bubbled into and through a bath of fused metal chlorides, e. g. a bath of one or more of the chlorides of potassium, sodium, aluminum, iron, zinc, bismuth, etc. The conditions of temperature and depth of the bath and rate of flow of the reaction mixture into the same are, of course, interdependent, but are regulated so as to provide for rapid and substantially complete reaction between the chlorine and the organic reactant. In perchlorinating tetrachloropropane at a bath temperature of between 350° and 500° C., the depth of the bath through which the reaction mixture is bubbled may be 8 inches or more and the rate of vapor flow may be such as to permit a reaction period of 30 seconds or less within the bath. The reaction which takes place involves a simultaneous chlorination and cracking of the partially chlorinated propane, so that the vapor mixture evolved from the salt bath comprises carbon tetrachloride and tetrachloroethylene as the principal organic products.

The vapors evolved from the salt bath chlorinator 21 are passed to a condenser 9 where they are cooled to condense and remove the perchlorinated products. The remaining gas, which consists largely of hydrogen chloride but usually contains some chlorine and may retain a minor amount of organic compounds, is admixed with the chlorine or mixture of chlorine and propane which is being fed to the reactor 7 and, as hereinbefore mentioned, serves as an inert diluent for the reactants to prevent them from reacting in violent manner. The chlorine and any organic ingredients in the diluent gas are absorbed and used in the photochemical chlorination.

The liquefied chlorinated products are passed from the condenser 9 to a still 27 where they are separated by fractional distillation. Any partially chlorinated propane recovered in the distillation is returned to the vaporizer 17 for recycling in the process.

The following example describes one way in which the principle of the invention has been applied, but is not to be construed as limiting its scope.

EXAMPLE

Propane was chlorinated in the continuous cyclic manner illustrated in the drawing and after establishing the conditions of operation the results of the process were determined. During the period over which the measurements were made, the feed to the reactor 7 was a mixture of chlorine, propane and the permanent gases (principally hydrogen chloride together with some chlorine) from the chlorinator 21. A total of 11,946 grams (168.4 moles) of chlorine (including the chlorine in the gas from the chlorinator 21) and 1883 grams (42.8 moles) of propane were fed to the reactor 7 during this period. The gaseous ingredients were admixed in the dark and the mixture was passed at a rate of between 10 and 25 gram moles of the gas mixture per hour into the reactor 7 where it was bubbled into liquid chlorinated propane of chlorine content corresponding closely to that of tetrachloropropane. The mixture within the reactor 7 was exposed to ultra-violet light of sufficient intensity to cause rapid and nearly complete reaction between the chlorine and the propane. The temperature of the reaction mixture was about 50° C. Hydrogen chloride was vented from the reaction mixture as formed. In this photochemical chlorination there were formed 6132 grams (168 moles) of hydrogen chloride and 7491 grams of chlorinated propane having a chlorine content of 79.7 per cent by weight and which apparently consisted for the most part of tetrachloro- and pentachloro-propanes. The 7491 grams of chlorinated propane from the photochemical chlorination and 17,821 grams (251 moles) of chlorine were passed into the vaporizer 17 wherein they were admixed in the proportions just given and vaporized by heating to a temperature between 160° and 170° C. The vaporized mixture was passed to the salt bath chlorinator 21 where it was bubbled into a molten equimolecular mixture of potassium and zinc chlorides heated to 425° C. The vapor mixture evolved from the salt bath was passed to the condenser 9, where it was cooled to condense the chlorinated products. The remaining gas, which flowed from the condenser at a temperature of −20° C., contained 5438 grams (149 moles) of hydrogen chloride, 7285 grams (102.6 moles) of free chlorine and approximately 11 gram moles of other noncondensable ingredients. These gases along with 1883 grams (42.8 moles) of propane and 4661 grams (65.8 moles) of chlorine comprised the feed to reactor 7 hereinbefore described. The condensed product consisted of 3750 grams (24.35 moles) of carbon tetrachloride, 4739 grams (28.55 moles) of tetrachlorethylene, 730 grams (2.91 moles) of hexachloropropane, 95.7 grams (0.336 mole) of hexachlorobenzene, and 335 grams of material which distilled at temperatures from 80° to 120° C. at atmospheric pressure.

Other saturated or unsaturated lower aliphatic hydrocarbons and chloro derivatives thereof having not more than two chlorine atoms in the molecule may advantageously be perchlorinated by the method herein disclosed. Examples of such other aliphatic compounds which may be employed in the process are methane, ethane, ethylene, ethyl chloride, ethylene chloride, propyl chloride, isopropyl chloride, propylene chloride, propylene, butane, butylene, monochloro- or dichloro-butane, pentane, amylene, etc.

The following table outlines operating conditions which are suitable for the perchlorination of certain of these aliphatic compounds by the present method.

We claim:

1. In a continuous process for perchlorinating an aliphatic compound of the class consisting of lower aliphatic hydrocarbons and chlorinated lower aliphatic hydrocarbons containing not more than 2 chlorine atoms in the molecule, the steps which consist in passing the aliphatic compound and chlorine, at least one of which has been diluted with hydrogen chloride, into a liquid medium at relative rates sufficient for substantial but incomplete chlorination of the aliphatic compound, while exposing the resultant mixture to actinic light of intensity sufficient to cause substantially complete reaction between the chlorine and the aliphatic compound, vaporizing and admixing the resultant partially chlorinated aliphatic compound with sufficient chlorine to perchlorinate the same, passing the vapor mixture into a fused metal chloride bath heated to a temperature between 350° and 500° C., whereby the aliphatic compound is perchlorinated, cooling the vapors evolved from the bath to condense the perchlorinated aliphatic product therefrom, and admixing the uncondensed gas comprising hydrogen chloride and chlorine with the reactants which are fed to the first of the foregoing steps.

2. In a continuous process for perchlorinating a lower aliphatic hydrocarbon containing not more than 5 carbon atoms in the molecule, the steps which consist in admixing the hydrocarbon with sufficient chlorine for substantial but incomplete chlorination of the same and with hydrogen chloride, passing the mixture into a liquid medium, while exposing the resultant mixture to actinic light of intensity sufficient to cause substantially complete reaction between the chlorine and the aliphatic compound, admixing the resultant partially chlorinated hydrocarbon with sufficient chlorine to perchlorinate the same, vaporizing the mixture, passing the vapors into a fused metal chloride bath heated to a temperature between 350° C. and 500° C. to complete the chlorination, cooling the vapors evolved from the bath to condense the perchlorinated aliphatic product therefrom, and returning the remaining gas comprising hydrogen chloride and chlorine to the first of the foregoing steps.

3. In a continuous process for perchlorinating a saturated aliphatic hydrocarbon which contains not more than 5 carbon atoms in the molecule, the steps which consist in admixing the hydrocarbon with sufficient chlorine for substantial but incomplete chlorination of the same and with hydrogen chloride, passing the mixture into a liquid medium, while exposing the resultant mixture to actinic light of intensity sufficient to cause substantially complete reaction between the chlorine and the aliphatic compound, admixing the resultant partially chlorinated hydrocarbon with sufficient chlorine to perchlorinate the same, va- Table

| Reaction condition | Aliphatic reactant | | | | | |
|---|---|---|---|---|---|---|
| | Methane | Ethane | Propane | Butane | Ethylene | Propylene |
| Reaction temp. in photochemical chlorination, °C | 25–40 | 50–100 | 25–100 | 100–200 | 50–100 | 25–100 |
| Mole ratio of Cl$_2$/aliphatic comp'd in feed to photochemical chlorination | 3 | 3 | 4 | 3 or 4 | 2 | 3 |
| Temp. for vaporizing product from photo-chemical chlorination | 60 | 75–150 | 150–200 | 200 | 75–150 | 150–200 |
| Mole ratio of Cl$_2$/partially chlorinated hydrocarbon | 1 | 3 | 4 | 7–6 | 3 | 4 |
| Salt bath temps., °C | 350–500 | 350–500 | 350–500 | 400–500 | 350–500 | 350–500 | porizing the mixture, passing the vapors into a fused metal chloride bath heated to a temperature between 350° and 500° C. to complete the chlorination, cooling the vapors evolved from the bath to condense the perchlorinated aliphatic product therefrom, and returning the remaining gas comprising hydrogen chloride and chlorine to the first of the foregoing steps.

4. In a continuous process for perchlorinating propane, the steps which consist in admixing the latter with approximately 4 molecular equivalents of chlorine and with hydrogen chloride, passing the mixture into a liquid medium wherein it is exposed to actinic light of intensity sufficient to cause substantially complete reaction between the chlorine and the propane, vaporizing and admixing the resultant partially chlorinated propane with sufficient chlorine to perchlorinate the same, passing the vapor mixture into fused metal chloride bath heated to a temperature between 350° and 500° C., whereby the chlorination is completed with simultaneous cracking of the product to form carbon tetrachloride and tetrachloroethylene as the principal organic products, cooling the vapors evolved from the bath to condense the perchlorinated aliphatic products therefrom, and returning the remaining gas comprising hydrogen chloride and chlorine to the first of the foregoing steps.

5. In a process for chlorinating propane, the steps which consist in reacting propane with approximately 4 molecular equivalents of chlorine at a temperature between about 25° and about 100° C. under exposure to actinic light, treating the resultant partially chlorinated propane with sufficient chlorine for perchlorination of same, vaporizing the mixture and contacting the vaporized mixture with a fused metal chloride bath heated to a temperature between 350° and 500° C., whereby further chlorination and cracking occur simultaneously to form carbon tetrachloride and tetrachloroethylene as the principal organic products together with chlorinated propanes as minor products, cooling the vapors evolved from the bath to condense the chlorinated aliphatic products therefrom and leave a mixture of hydrogen chloride and chlorine and returning the mixture to the first of the foregoing steps, fractionally distilling the chlorinated aliphatic products to separate the same, and returning the chlorinated propanes for admixture with additional chlorine and recycling through the fused metal chloride bath.

THOMAS E. BROWN.
CLYDE W. DAVIS.